(12) United States Patent
Yuan et al.

(10) Patent No.: US 12,229,481 B2
(45) Date of Patent: Feb. 18, 2025

(54) CONSTRUCTION METHOD AND SYSTEM FOR HYDRODYNAMIC JOINT COMPUTATION MODEL, DEVICE, AND MEDIUM

(71) Applicants: CHONGQING JIAOTONG UNIVERSITY, Chongqing (CN); CHONGQING XIKE CONSULTING CO., LTD FOR WATER TRANSPORT ENGINEERING, Chongqing (CN)

(72) Inventors: Hao Yuan, Chongqing (CN); Peiyi Peng, Chongqing (CN); Dewei Mu, Chongqing (CN); Wei Diao, Chongqing (CN); Yiming Zhang, Chongqing (CN); Di Xu, Chongqing (CN)

(73) Assignees: CHONGQING JIAOTONG UNIVERSITY, Chongqing (CN); CHONGQING XIKE CONSULTING CO., LTD. FOR WATER TRANSPORT ENGINEERING, Chongqing (CN)

( * ) Notice: Subject to any disclaimer, the term of this patent is extended or adjusted under 35 U.S.C. 154(b) by 0 days.

(21) Appl. No.: 18/427,858

(22) Filed: Jan. 31, 2024

(65) Prior Publication Data
US 2024/0296266 A1    Sep. 5, 2024

(30) Foreign Application Priority Data
Feb. 1, 2023    (CN) .......................... 202310085150.6

(51) Int. Cl.
*G06F 30/28* (2020.01)
*G06F 30/23* (2020.01)
*G06F 111/10* (2020.01)

(52) U.S. Cl.
CPC .............. *G06F 30/28* (2020.01); *G06F 30/23* (2020.01); *G06F 2111/10* (2020.01)

(58) Field of Classification Search
CPC ....... G06F 30/28; G06F 30/23; G06F 2111/10
(Continued)

(56) References Cited

U.S. PATENT DOCUMENTS 7,542,890 B2 * 6/2009 Yang ...................... G06F 30/23
703/2
10,409,950 B2 * 9/2019 Dweik .................... G06F 30/20
(Continued)

FOREIGN PATENT DOCUMENTS

| CN | 108897940 A | 11/2018 |
| CN | 109145316 A | 1/2019 |

(Continued)

OTHER PUBLICATIONS

D.H. Stright Jr. (Grand Forks—Modelling a Three-Dimensional Reservoir With Two-Dimensional Reservoir Simulators, 1974, the Journal of Canadian Petroleum, pp. 45-52) (Year: 1974).*

(Continued)

*Primary Examiner* — Iftekhar A Khan
(74) *Attorney, Agent, or Firm* — Bayramoglu Law Offices LLC (57) ABSTRACT

The present disclosure belongs to the field of computational hydraulics and aims at providing a construction method and system for a hydrodynamic joint computation model, a device, and a medium. The present disclosure, by coupling a two-dimensional model and a three-dimensional model in an initial hydrodynamic joint computation model, model parameters of inner boundaries of the two-dimensional model and the three-dimensional model are unified, and the hydrodynamic joint computation model is established, so that the technical effect of accurately depicting change and
(Continued)

distribution situations of a water depth and a flow velocity within a range of large-scale reservoirs in a three-dimensional space is achieved based on boundary flow conditions of the large-scale reservoirs and the hydrodynamic joint computation model, the advantages of high efficiency of the two-dimensional model and high accuracy of the three-dimensional model are fully taken, and then, accurate and efficient simulation for reservoir flow fields is achieved.

6 Claims, 4 Drawing Sheets

(58) Field of Classification Search
USPC .............................................. 703/2
See application file for complete search history.

(56) References Cited

U.S. PATENT DOCUMENTS

| | | | | |
|---|---|---|---|---|
| 11,180,975 | B2* | 11/2021 | Renaudeau | G01V 1/282 |
| 2012/0303339 | A1* | 11/2012 | Cruz | G06F 30/28 |
| | | | | 703/2 |
| 2013/0218538 | A1* | 8/2013 | Fuecker | G06F 30/23 |
| | | | | 703/2 |
| 2014/0278298 | A1* | 9/2014 | Maerten | G01V 20/00 |
| | | | | 703/2 |
| 2016/0131800 | A1* | 5/2016 | Pecher | G06F 30/23 |
| | | | | 703/10 |
| 2019/0093469 | A1* | 3/2019 | Williams | E21B 44/00 |
| 2022/0043952 | A1* | 2/2022 | Giljarhus | G01W 1/10 |
| 2022/0114302 | A1* | 4/2022 | Skripkin | G06N 20/20 |
| 2022/0309199 | A1* | 9/2022 | Rao | G06F 30/20 |
| 2022/0391567 | A1* | 12/2022 | Zhou | G06F 30/25 |
| 2023/0383622 | A1* | 11/2023 | Han | G01V 20/00 |

FOREIGN PATENT DOCUMENTS

| | | |
|---|---|---|
| CN | 112257352 A | 1/2021 |
| CN | 114332395 A | 4/2022 |
| WO | 2015110599 A1 | 7/2015 |

OTHER PUBLICATIONS

Hui-luan al. (A Coupling hydrodynamic model of a whole basin, 2008, IEEE, 684-688) (Year: 2008).*

Author:Hu Kaiheng, Cui Peng, Tian Mi, Yang Hongjuan Title of article: A review of the debris flow dynamic models and numerical simulation Title of book: Journal of Water Resources Date: Dec. 2012 pp. 79-84.

Author:Cui Guan-zhe, Shen Lin-fang, Wang Zhi-liang, Tang Zheng-guang, Xu Ze-min Title of article: Numerical simulation of mesoscopic seepage field of soil CT scanned slice based on lattice Boltzmann method Title of book: Rock and Soil Mechanics Date: May 2016.

Author: Huang Yu-xin, Zhang Ning-chuan Title of article: Research on a coupled 2D-3D hydrodynamic model I: model establishment Title of book: Journal of Waterway and Harbor Date: Aug. 2013 pp. 304-310.

Author:Yongqin Peng, Wei Diao, Xujin Zhang, Chunze Zhang and Shuqing Yang Title of article: Three-Dimensional Numerical Method forSimulating Large-Scale Free Water Surface byMassive Parallel Computing on a GPU Title of book: Water Date:Oct. 13, 2019.

* cited by examiner

CONSTRUCTION METHOD AND SYSTEM FOR HYDRODYNAMIC JOINT COMPUTATION MODEL, DEVICE, AND MEDIUM

TECHNICAL FIELD

The present disclosure belongs to the technical field of computational hydraulics, and particularly relates to a construction method and system for a hydrodynamic joint computation model, a device, and a medium.

BACKGROUND ART

With the rapid growth of the volumes and quantity of reservoirs in China, the reservoirs are also becoming more and more closely related to the production and life of people. Therefore, the research on the distribution of reservoir flow fields is very important for optimizing the design of hydro-junctions and operation scheduling methods for the reservoirs to avoid or reduce local impacts of the reservoirs. In the past, prediction methods for reservoir flow fields in China mainly included an empirical analysis method, a physical model test method and a mathematical model method, wherein the mathematical modeling method is to establish a mathematical model including control equations and corresponding boundary conditions by analyzing a heat transfer mechanism of a water body and taking various factors affecting heat transfer into account, and finally to solve a mathematical model to obtain a distribution situation of the reservoir flow fields. In recent years, with the development of computer performances and algorithm technologies, the mathematical model method has gradually become an important means to research the distribution of the reservoir flow fields due to characteristics such as low cost, high universality, and high accuracy.

However, in a process that the prior art is used, the inventor has found that there are at least the following problems in the prior art:

At present, mathematical models for the reservoir flow fields relatively fall behind, and are still mainly planar two-dimensional models. These models often cannot be directly used as the basis for solving engineering problems due to excessive assumption and generalization for actual physical problems, great errors between a research conclusion and an actual situation, and difficulty in promotion to a general rule.

Specifically, actual large-scale reservoirs often extend for tens of kilometers, and are relatively complex in terrain conditions and boundary conditions for causing convergence, especially in bends, bayonets and near-dam water areas of reservoirs. However, the traditional methods are limited by a boundary processing method and a computation dimension, and therefore, a two-dimensional model is usually adopted, and the changes of physical quantities in a vertical dimension are ignored. However, there are significant three-dimensional flow characteristics in such water areas, simulation results obtained by using a two-dimensional planar model are greatly different from actual situations, and are even completely distorted. A three-dimensional mathematical model is more suitable for simulating hydraulic problems under complex source and convergence conditions, and obtains a result with the advantages of high accuracy and universality so as to be capable of providing technical support for solving engineering problems. However, when being used for three-dimensional simulation, a conventional numerical method is often too high in requirements for computing resources, is to be improved in terms of computational stability and convergence, and is only suitable for the computation and analysis of local dimensions of reservoirs. For large-scale problems, with the Three Gorges Reservoir as an example in which the storage capacity under a normal storage level reaches 39,300,000,000 $m^3$, a channel of a reservoir area extends for more than 600 km, and the time of a flood peak passing through the reservoir is measured in days, if the average size of computational grids is 5 $m^3$, more than 7,000,000,000 computational grids are needed, and thus, simulation cannot be performed by conventional computers, and supercomputer resources are very scarce. In addition, there are periodic water level fluctuations in the reservoir, there are complex source and convergence processes on the boundaries of the reservoir, and a complex mutual coupling effect also occurs in a hydrodynamic process of a flow velocity field in the reservoir. These factors significantly increase the difficulty of simulation, thereby resulting in the lack of an accurate and efficient numerical simulation method for integral simulation research on the hydrodynamic problems of the large-scale reservoirs at present.

SUMMARY

The present disclosure aims at solving the above-mentioned technical problems to a certain extent at least, and provides a construction method and system for a hydrodynamic joint computation model, a device, and a medium.

In order to achieve the above-mentioned objects, the present disclosure adopts the following technical solutions.

In a first aspect, the present disclosure provides a construction method for a hydrodynamic joint computation model, including:

constructing an initial hydrodynamic joint computation model, the initial hydrodynamic joint computation model including a two-dimensional model and a three-dimensional model which are connected in sequence, a plurality of layers of computational grids being nested in a junction of the two-dimensional model and the three-dimensional model, the plurality of layers of computational grids of the two-dimensional model forming inner boundaries of the two-dimensional model, and the plurality of layers of computational grids of the three-dimensional model forming inner boundaries of the three-dimensional model;

respectively initializing the two-dimensional model and the three-dimensional model;

obtaining three-dimensional definition parameters of the inner boundaries of the three-dimensional model according to two-dimensional initial parameters of the computational grids in the inner boundaries of the two-dimensional model, and then, assigning the three-dimensional definition parameters to the inner boundaries of the three-dimensional model;

obtaining two-dimensional definition parameters of the computational grids in the inner boundaries of the two-dimensional model according to the three-dimensional definition parameters of the inner boundaries of the three-dimensional model, and then, assigning the two-dimensional parameters to the computational grids in the inner boundaries of the two-dimensional model; and updating the two-dimensional definition parameters into new two-dimensional initial parameters, and then, reobtaining the three-dimensional definition parameters of the inner boundaries of the three-dimensional model according to the two-dimensional initial parameters of the computational grids in the inner boundaries of the two-dimensional model until computation is converged or ended when a preset simulation time is reached to obtain the hydrodynamic joint computation model.

In the present disclosure, by coupling the two-dimensional model and the three-dimensional model in the initial hydrodynamic joint computation model, model parameters of inner boundaries of the two-dimensional model and the three-dimensional model are unified, and the hydrodynamic joint computation model is established, so that the technical effect of accurately depicting change and distribution situations of a water depth and a flow velocity within a range of large-scale reservoirs in a three-dimensional space is achieved based on boundary flow conditions of the large-scale reservoirs and the hydrodynamic joint computation model, the advantages of high efficiency of the two-dimensional model and high accuracy of the three-dimensional model are fully taken, and then, accurate and efficient simulation for reservoir flow fields is achieved.

In a possible design, four layers of computational grids are nested in the junction of the two-dimensional model and the three-dimensional model, the four layers of computational grids of the two-dimensional model form the inner boundaries of the two-dimensional model, the four layers of computational grids of the three-dimensional model form the inner boundaries of the three-dimensional model, and the inner boundaries of the two-dimensional model are aligned with the inner boundaries of the three-dimensional model.

In a possible design, the respectively initializing the two-dimensional model and the three-dimensional model includes:
defining reference quantities to achieve conversion between grid units and physical units in the two-dimensional model and the three-dimensional model.

In a possible design, the respectively initializing the two-dimensional model and the three-dimensional model further includes:
defining a dimensional relation so as to obtain all reference quantities according to a specified reference quantity based on the dimensional relation.

In a possible design, the obtaining three-dimensional definition parameters of the inner boundaries of the three-dimensional model according to two-dimensional initial parameters of the computational grids in the inner boundaries of the two-dimensional model includes:
obtaining actual physical quantities of the computational grids in the inner boundaries of the two-dimensional model according to the two-dimensional initial parameters of the computational grids in the inner boundaries of the two-dimensional model; and
obtaining the three-dimensional definition parameters of the inner boundaries of the three-dimensional model according to the actual physical quantities of the computational grids in the inner boundaries of the two-dimensional model.

In a possible design, the assigning the three-dimensional definition parameters to the inner boundaries of the three-dimensional model includes:
obtaining the number of vertical grids in the inner boundaries of the three-dimensional model according to the three-dimensional definition parameters;
obtaining unit definition parameters of all vertical computational grids in the inner boundaries of the three-dimensional model according to the three-dimensional definition parameters and the number of the vertical grids; and
respectively assigning the unit definition parameters to all the vertical computational grids in the inner boundaries of the three-dimensional model.

In a possible design, the obtaining two-dimensional definition parameters of the computational grids in the inner boundaries of the two-dimensional model according to the three-dimensional definition parameters of the inner boundaries of the three-dimensional model includes:
obtaining actual physical quantities of any computational grids in the inner boundaries of the three-dimensional model according to the three-dimensional definition parameters of the inner boundaries of the three-dimensional model; and
obtaining the two-dimensional definition parameters of the inner boundaries of the two-dimensional model according to the actual physical quantities of the computational grids in the inner boundaries of the three-dimensional model.

In a second aspect, the present disclosure provides a construction system for a hydrodynamic joint computation model, configured to achieve the construction method for the hydrodynamic joint computation model according to any one mentioned above; and the construction system for the hydrodynamic joint computation model includes:
a model construction module configured to construct an initial hydrodynamic joint computation model, the initial hydrodynamic joint computation model including a two-dimensional model and a three-dimensional model which are connected in sequence, a plurality of layers of computational grids being nested in a junction of the two-dimensional model and the three-dimensional model, the plurality of layers of computational grids of the two-dimensional model forming inner boundaries of the two-dimensional model, and the plurality of layers of computational grids of the three-dimensional model forming inner boundaries of the three-dimensional model;
a model initialization module in communication connection with the model construction module and configured to respectively initialize the two-dimensional model and the three-dimensional model; and
a model coupling module in communication connection with the model initialization module and configured to obtain three-dimensional definition parameters of the inner boundaries of the three-dimensional model according to two-dimensional initial parameters of the computational grids in the inner boundaries of the two-dimensional model, and then, assign the three-dimensional definition parameters to the inner boundaries of the three-dimensional model; configured to obtain two-dimensional definition parameters of the computational grids in the inner boundaries of the two-dimensional model according to the three-dimensional definition parameters of the inner boundaries of the three-dimensional model, and then, assign the two-dimensional parameters to the computational grids in the inner boundaries of the two-dimensional model; and further configured to update the two-dimensional definition parameters into new two-dimensional initial parameters, and then, reobtain the three-dimensional definition parameters of the inner boundaries of the three-dimensional model according to the two-dimensional initial parameters of the computational grids in the inner boundaries of the two-dimensional model until computation is converged or ended when a preset simulation time is reached to obtain the hydrodynamic joint computation model.

In a third aspect, the present disclosure provides an electronic device, including:
- a memory configured to store a computer program instruction; and
- a processor configured to execute the computer program instruction, thereby completing the operation of the construction method for the hydrodynamic joint computation model according to any one mentioned above.

In a fourth aspect, the present disclosure provides a computer-readable storage medium configured to store a computer-readable computer program instruction, wherein the computer program instruction is configured to, when operating, perform the operation of the construction method for the hydrodynamic joint computation model according to any one mentioned above.

DETAILED DESCRIPTION OF THE EMBODIMENTS

To describe the technical solutions in the embodiments of the present disclosure or the prior art more clearly, the present disclosure will be briefly introduced below in conjunction with the accompanying drawings and the description for the embodiments or prior art. Obviously, the following descriptions for the structures in the accompanying drawings merely show some embodiments of the present disclosure, and those of ordinary skill in the art may still derive other accompanying drawings from these accompanying drawings without creative efforts. Therefore, it should be noted that the descriptions for ways in these embodiments are intended to help understand the present disclosure, rather than to limit the present disclosure.

Embodiment 1

The present embodiment discloses a construction method for a hydrodynamic joint computation model, which may be performed by, but not limited to a computer device or virtual machine with a certain computing resource, for example, the construction method is performed by an electronic device such as a personal computer, a smartphone, a personal digital assistant or a wearable device, or is performed by a virtual machine.

Figure 1:
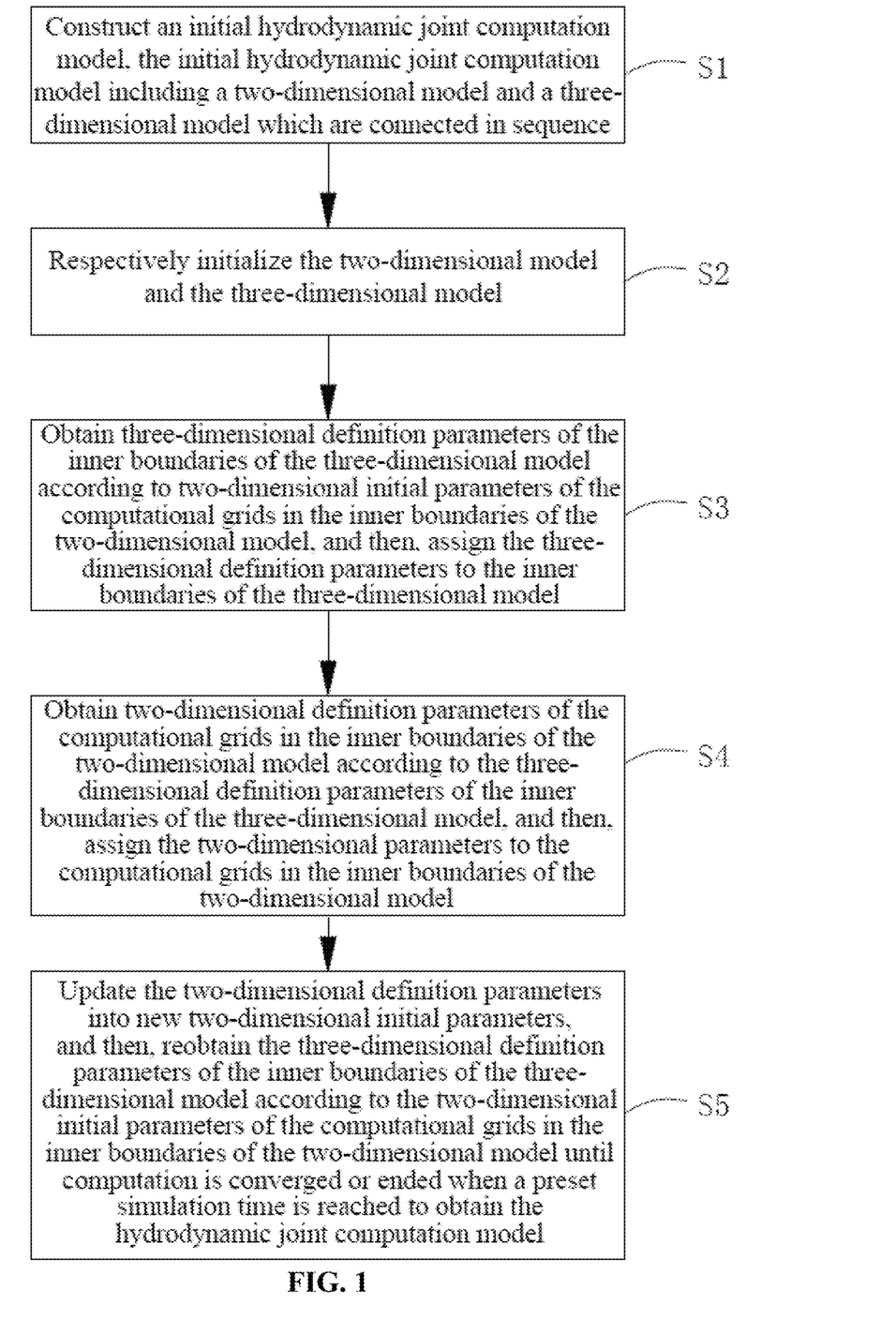
FIG. 1 is a flow diagram of a construction method for a hydrodynamic joint computation model in embodiment 1.

As shown in FIG. 1, a construction method for a hydrodynamic joint computation model may include, but is not limited to the following steps:

S1. An initial hydrodynamic joint computation model is constructed according to a simulated flow problem, wherein the initial hydrodynamic joint computation model includes a two-dimensional model and a three-dimensional model which are connected in sequence; it should be noted that the two-dimensional model and the three-dimensional model respectively divide a reservoir simulation area into a two-dimensional model computational domain and a three-dimensional model computational domain which are connected; a plurality of layers of computational grids are nested in a junction of the two-dimensional model and the three-dimensional model, the plurality of layers of computational grids of the two-dimensional model form inner boundaries of the two-dimensional model, and the plurality of layers of computational grids of the three-dimensional model form inner boundaries of the three-dimensional model; it should be noted that the inner boundaries of the two-dimensional model and the inner boundaries of the three-dimensional model form inner boundaries of the initial hydrodynamic joint computation model, and the inner boundaries are connection parts between the two-dimensional model computational domain and the three-dimensional model computational domain; and from the perspective of joint computation, each of boundaries of the two-dimensional model and boundaries of the three-dimensional model can be divided into inner boundaries and outer boundaries, wherein the outer boundaries of the two-dimensional model and the outer boundaries of the three-dimensional model are all physical boundaries of the reservoir simulation area, and macroscopic quantities thereof are determined according to the simulated physical problem and an actual situation, and the inner boundaries of the two-dimensional model and the inner boundaries of the three-dimensional model are all not the physical boundaries, but are coupling surfaces set herein for the purpose of transition among physical quantities on different dimensions.

Specifically, in the present embodiment, the inner boundaries of the two-dimensional model and the inner boundaries of the three-dimensional model are set to overlap, and are disposed on a riverbed wherein the bed surface is flat and the gradient is gentle in the reservoir simulation area. In the present embodiment, the macroscopic quantities on the inner boundaries of the two-dimensional model are obtained by averaging computational data of the three-dimensional model, and accordingly, the macroscopic quantities on the inner boundaries of the three-dimensional model are obtained by inversing computational data of the two-dimensional model. In the present embodiment, the two-dimensional model computational domain and the three-dimensional model computational domain are reasonably divided according to the simulated flow problem, and four layers of grids are nested as inner boundaries in a junction of the two computational domains.

In addition, it should be further noted that, in the present embodiment, overlapping means that the inner boundaries of the two-dimensional model are transversely aligned with the inner boundaries of the three-dimensional model, and one grid of the two-dimensional model corresponds to a longitudinal column of grids of the three-dimensional model. It should be further understood that, in the present embodiment, ends, away from the three-dimensional model, of the two-dimensional model form the outer boundaries of the two-dimensional model, and ends, away from the two-dimensional model, of the three-dimensional model form the outer boundaries of the three-dimensional model.

Figure 2:
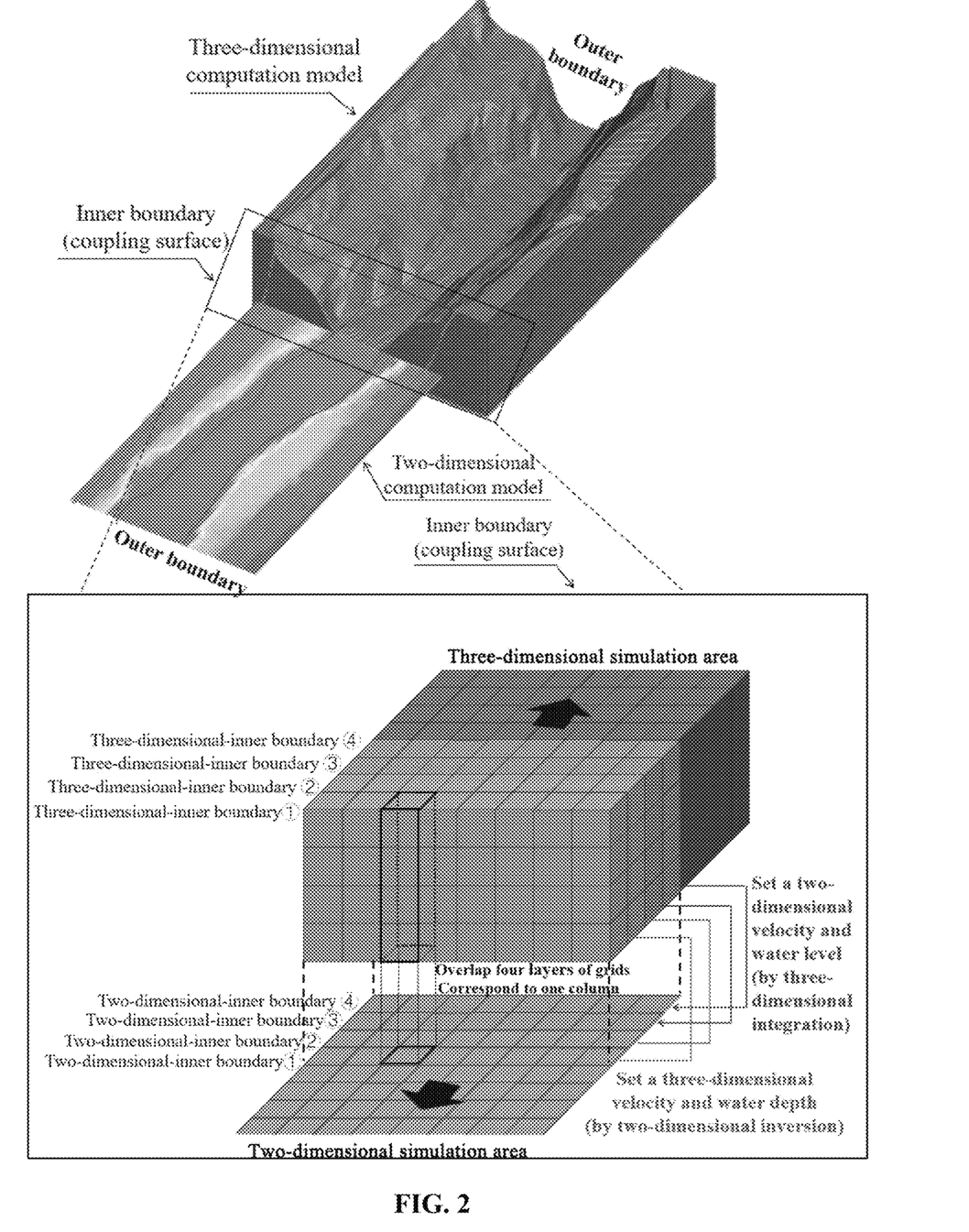
FIG. 2 is a schematic structural diagram of coupling of a two-dimensional model and a three-dimensional model in an initial hydrodynamic joint computation model in embodiment 1.
Figure 3A:
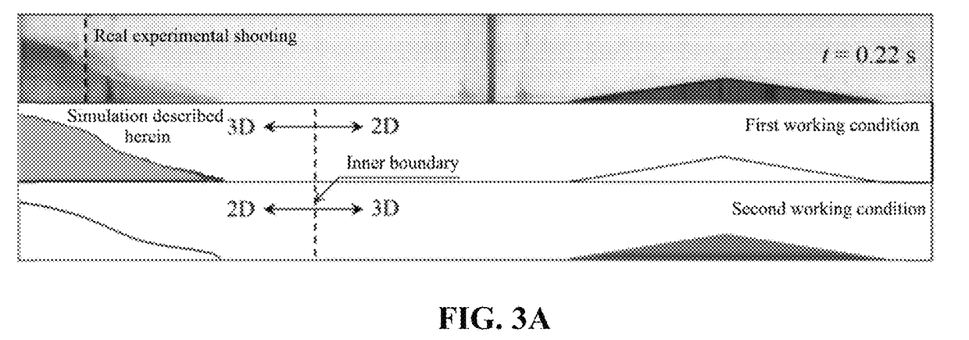
FIG. 3A, FIG. 3B, FIG. 3C and FIG. 3D are example diagrams of a hydrodynamic joint computation model in embodiment 1.
Figure 3B:
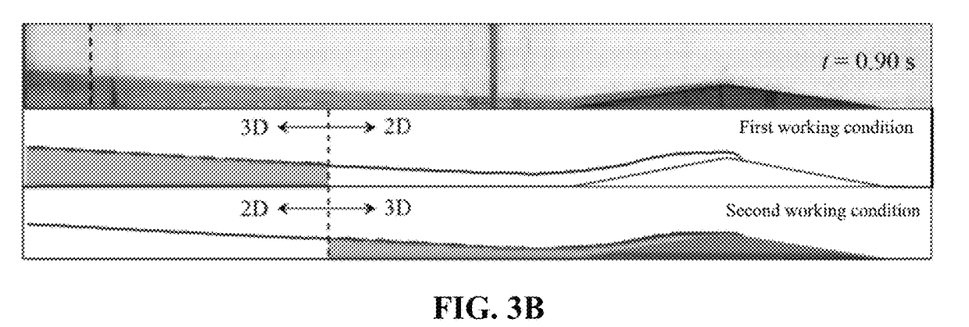
Figure 3C:
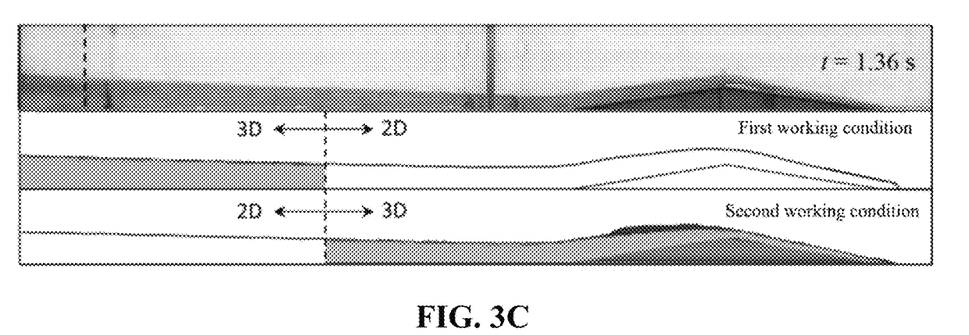
Figure 3D:
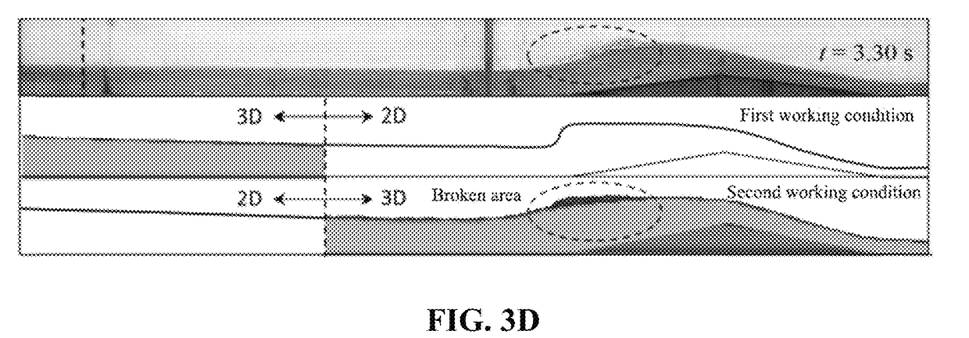

In order to ensure sufficient binding forces of the inner boundaries, avoid non-physical fluctuations on the inner boundaries, and achieve smooth transition of each physical quantity on the inner boundaries, in the present embodiment, as shown in FIG. 2, four layers of computational grids are nested in the junction of the two-dimensional model and the three-dimensional model, the four layers of computational grids of the two-dimensional model form the inner boundaries of the two-dimensional model, the four layers of computational grids of the three-dimensional model form the inner boundaries of the three-dimensional model, and the inner boundaries of the two-dimensional model are aligned with the inner boundaries of the three-dimensional model, that is, one computational grid of the two-dimensional model corresponds to a longitudinal column of computational grids of the three-dimensional model in a longitudinal direction, and the number of transverse computational grids of the two-dimensional model is the same as the number of transverse computational grids of the three-dimensional model.

S2. The two-dimensional model and the three-dimensional model are respectively initialized; reference quantities are defined to achieve conversion between grid units and physical units in the two-dimensional model and the three-dimensional model;

specifically, the step that the two-dimensional model and the three-dimensional model are respectively initialized includes:

reference quantities are defined to achieve conversion between grid units and physical units in the two-dimensional model and the three-dimensional model.

In the present embodiment, if the grid units of the physical quantities such as a length, a density, a time and a kinematic viscosity in each of the two-dimensional model and the three-dimensional model are L, ρ, t and v, respectively, and the corresponding actual physical units are L', ρ', t' and v', the defined reference quantities include: a reference length $L_r$, a reference density $\rho_r$ and a reference velocity $u_r$. The specific definitions are shown as follows: $L_r=L'L$, $\rho_r=\rho'/\rho$, $u_r=C_s'C_s$, wherein $C_s'$ and $C_s$ are sound velocities under the physical units and the grid units, respectively.

The step that the two-dimensional model and the three-dimensional model are respectively initialized further includes:

a dimensional relation is defined so as to obtain all reference quantities according to a specified reference quantity based on the dimensional relation.

For a certain flow problem to be simulated, the grid units L, ρ, c and v used in the two-dimensional model or the three-dimensional model are known, and the corresponding actual physical units may also be determined according to a formula or chart. For example, usually, the reference quantities $\rho_r$ and $u_r$ are directly determined, but $L_r$ is undetermined. Therefore, the following dimensional relation needs to be supplemented according to a dimensional relationship: $L_r u_r=v'v$, so far, all of the four unknown numbers $L_r$, $\rho_r$, c, and L' can be solved. According to $L_r/u_r=t'/t$, a conversion relationship among/can also be obtained.

S3. First time-step iteration is performed on the two-dimensional model, three-dimensional definition parameters of the inner boundaries of the three-dimensional model are obtained according to two-dimensional initial parameters of the computational grids in the inner boundaries of the two-dimensional model (such as inner boundaries ① and ② of the two-dimensional model in FIG. 2), and then, the three-dimensional definition parameters are assigned to the inner boundaries of the three-dimensional model (such as inner boundaries ① and ② of the three-dimensional model in FIG. 2); wherein the three-dimensional definition parameters include a water depth $H_{2D\text{-}1}$ and a velocity $V_{2D\text{-}1}$;

In the present embodiment, the step that three-dimensional definition parameters of the inner boundaries of the three-dimensional model are obtained according to two-dimensional initial parameters of the computational grids in the inner boundaries of the two-dimensional model includes:

S301. Actual physical quantities of the computational grids in the inner boundaries of the two-dimensional model are obtained according to the two-dimensional initial parameters of the computational grids in the inner boundaries of the two-dimensional model; in the present embodiment, the actual physical quantities are expressed as: $Y'=Y_{r\text{-}2D} \cdot Y_{2D}$ in which $Y_{r\text{-}2D}$ is a reference quantity, and $Y_{2D}$ is a two-dimensional initial parameter.

S302. The three-dimensional definition parameters of the inner boundaries of the three-dimensional model are obtained according to the actual physical quantities of the computational grids in the inner boundaries of the two-dimensional model.

In the present embodiment, the reference quantities include reference water depths $H_{r\text{-}2D}$, accordingly, the two-dimensional initial parameters include two-dimensional grid water depths $H_{2D}$, and the three-dimensional definition parameters include three-dimensional grid water depths $H_{3D}$. The three-dimensional definition parameters of the inner boundaries of the three-dimensional model are obtained according to the grid depth $H_{2D}$ of each of the computational grids in the inner boundaries of the two-dimensional model, which includes:

actual water depths of the computational grids in the inner boundaries of the two-dimensional model are obtained according to the two-dimensional grid water depths $H_{2D}$ of the computational grids in the inner boundaries of the two-dimensional model; specifically, in the present embodiment, the actual water depths are expressed as: $H'=H_{r\text{-}2D} \cdot H_{2D}$; and the three-dimensional grid water depths $H_{3D}$ of the inner boundaries of the three-dimensional model are obtained according to the actual water depths of the computational grids in the inner boundaries of the two-dimensional model; specifically, in the present embodiment, the three-dimensional grid water depths $H_{3D}$ are expressed as: $H_{3D}=H' \cdot H_{r\text{-}3D}$.

In the present embodiment, the step that the three-dimensional definition parameters are assigned to the inner boundaries of the three-dimensional model includes:

S303. The number of vertical grids in the inner boundaries of the three-dimensional model is obtained according to the three-dimensional definition parameters;

S304. Unit definition parameters of all vertical computational grids in the inner boundaries of the three-dimensional model are obtained according to the three-dimensional definition parameters and the number of the vertical grids; it should be noted that the unit definition parameters=the three-dimensional definition parameters/the number of the vertical grids; and S305. The unit definition parameters are respectively assigned to all the vertical computational grids in the inner boundaries of the three-dimensional model.

In the present embodiment, the number of the vertical grids in the inner boundary of the three-dimensional model is a number obtained by rounding up to an integer after sizes of the grids are divided by the grid water depths. Specifically, the number of the vertical grids is expressed as: $N_{(i,j)}=[H_{3D}/\Delta Z]+1$, wherein $[H_{3D}/\Delta Z]$ is the number of fluid grids, and "+1" represents interface grids on the topmost of the three-dimensional model. In the present embodiment, a volume fraction of a fluid is expressed as: $m=(H_{3D}-[H_{3D}/\Delta Z] \cdot \Delta Z)/\Delta Z$.

As an example, if the two-dimensional grid water depths of the computational grids in the inner boundaries of the two-dimensional model are expressed as $H_{2D}=1.25$ m, and vertical unit dimensions of grids of the three-dimensional model are expressed as: $\Delta Z=0.3$ m, five grids including four fluid grids of which the volume fractions are 1 and an interface grid of which the volume fraction is $(1.25-0.3\times 4)/0.3=1/6$ need to be initialized in vertical directions of the inner boundaries of the three-dimensional model. Water depths of the inner boundaries of the three-dimensional model, obtained by such steps, may be consistent with water depths of the inner boundaries of the two-dimensional model, and actual water depths of the two-dimensional model and the three-dimensional model obtained after conversion are both H'.

S4. First to $N^{th}$ time-step iterations are performed on the assigned inner boundaries of the three-dimensional model, two-dimensional definition parameters of the computational grids in the inner boundaries of the two-dimensional model are obtained according to the three-dimensional definition parameters of the inner boundaries of the three-dimensional model (such as inner boundaries ③ and ④ of the three-dimensional model in FIG. 2), and then, the two-dimensional parameters are assigned to the computational grids in the inner boundaries of the two-dimensional model (such as inner boundaries ③ and ④ of the two-dimensional model in FIG. 2); wherein the two-dimensional definition parameters include a water depth $H_{3D-N}$ and a velocity $V_{3D-N}'$;

In the present embodiment, the step that two-dimensional definition parameters of the computational grids in the inner boundaries of the two-dimensional model are obtained according to the three-dimensional definition parameters of the inner boundaries of the three-dimensional model includes:

S401. Actual physical quantities of any computational grids in the inner boundaries of the three-dimensional model are obtained according to the three-dimensional definition parameters of the inner boundaries of the three-dimensional model; and S402. The two-dimensional definition parameters of the inner boundaries of the two-dimensional model are obtained according to the actual physical quantities of the computational grids in the inner boundaries of the three-dimensional model.

$$\Delta Z \cdot \sum_{n=1}^{N-1} u_n + m\Delta Z \cdot u_N,$$

and actual flows of any computational grids in the inner boundaries of the three-dimensional model are expressed as:

$$Q' = \left(\Delta Z \cdot \sum_{n=1}^{N-1} u_n + m\Delta Z \cdot u_N\right) \cdot (u_{r-3D} \cdot H_{r-3D});$$

and a two-dimensional definition flow velocity at a certain grid (i,j) in the inner boundaries of the two-dimensional model is expressed as:

$$u_{2D} = Q'/(H_{r-2D} \cdot H_{2D}) \cdot u_{r-2D} = $$
$$\left(\Delta Z \cdot \sum_{n=1}^{N-1} u_n + m\Delta Z \cdot u_N\right) \cdot (u_{r-3D} \cdot H_{r-3D})/[(H_{r-2D} \cdot H_{2D}) \cdot u_{r-2D}].$$

S5. The two-dimensional definition parameters are updated into new two-dimensional initial parameters, and then, the three-dimensional definition parameters of the inner boundaries of the three-dimensional model are obtained according to the two-dimensional initial parameters of the computational grids in the inner boundaries of the two-dimensional model, that is, steps S3 to S4 are repeated until computation is converged or ended when a preset simulation time is reached to obtain the hydrodynamic joint computation model. Hydrodynamic simulation state data of a preset reservoir simulation area can be acquired according to the hydrodynamic joint computation model, so that a user can master a hydrodynamic situation of the preset reservoir simulation area.

As an example, when the reference quantities include the reference flows $u_{r-2D}$, accordingly, the two-dimensional initial parameters include the two-dimensional grid flows $u_{2D}$, and the three-dimensional definition parameters include three-dimensional grid flows $u_{3D}$, in the present embodiment, it is regarded that the computation is converged and the flows are stabilized when the following formula is satisfied, wherein a small quantity is selected as $\varepsilon=10^{-6}$.

$$\text{Error} = \frac{\sqrt{\sum_{i,j,k}\left\{[u_x(i,j,k,t+\delta_t) - u_x(i,j,k,t)]^2 + [u_y(i,j,k,t+\delta_t) - u_y(i,j,k,t)]^2 + [u_z(i,j,k,t+\delta_t) - u_z(i,j,k,t)]^2\right\}}}{\sqrt{\sum_{i,j,k}\left\{[u_x(i,j,k,t+\delta_t)^2 + u_y(i,j,k,t+\delta_t)^2 + u_z(i,j,k,t+\delta_t)^2]\right\}}} < \varepsilon.$$

As an example, when the three-dimensional definition parameters adopt three-dimensional grid water depths $H_{3D}$, values thereof are expressed as: $H_{3D}=(N-1)\cdot\Delta Z+m\cdot\Delta Z$, and actual water depths of any computational grids in the inner boundaries of the three-dimensional model are expressed as: $H'=H_{r-3D}\cdot H_{3D}$; and accordingly, the two-dimensional definition parameters of the inner boundaries of the two-dimensional model are expressed as: $H_{2D}=H'/H_{r-2D}=H_{r-3D}\cdot((N-1)\cdot\Delta Z+m\cdot\Delta Z)/H_{r-2D}$.

In the present embodiment, the reference quantities further include reference flows $u_{r-2D}$, accordingly, the two-dimensional initial parameters include two-dimensional grid flows $u_{2D}$, and the three-dimensional definition parameters include three-dimensional grid flows $u_{3D}$. When the three-dimensional definition parameters adopt the three-dimensional grid flows $u_{3D}$, values thereof are expressed as:

In the present embodiment, by coupling the two-dimensional model and the three-dimensional model in the initial hydrodynamic joint computation model, model parameters of inner boundaries of the two-dimensional model and the three-dimensional model are unified, and the hydrodynamic joint computation model is established, so that the technical effect of accurately depicting change and distribution situations of a water depth and a flow velocity within a range of large-scale reservoirs in a three-dimensional space is achieved based on boundary flow conditions of the large-scale reservoirs and the hydrodynamic joint computation model, the advantages of high efficiency of the two-dimensional model and high accuracy of the three-dimensional model are fully taken, and then, accurate and efficient simulation for reservoir flow fields is achieved.

In the present embodiment, an example of the hydrodynamic joint computation model is described as follows:

a dam break wave is an interrupted wave, that is, parts of physical parameters of a water flow will be interrupted in a flow direction, and from the perspective of mathematical simulation, it is a Riemann problem of a nonlinear equation, which has certain complexity. However, the study of the dam break wave is extremely important. When dam break accidents occur in actual water conservancy projects, the sudden change of a water level and a flow velocity of a river may bring disastrous consequences to the production and life of people, the natural environment, etc. By adopting the hydrodynamic joint computation model constructed in the present embodiment, the evolution of the dam break wave in an uneven riverbed can be efficiently simulated. As an example, the total length of an upstream and a downstream of the overall channel is 8.9 m, a gate is 4.65 m away from an upstream boundary, and a triangular step with a height of 0.075 m and a length of 1 m is disposed in the downstream 1.5 m away from the gate. The water depth in the reservoir before the gate is 0.25 m, and there is no water in the downstream of the reservoir. A water depth in a reservoir in the front of the gate is 0.25 m, and there is no water in the downstream of the reservoir. The coupled inner boundaries of the two-dimensional model/the three-dimensional model are disposed in the downstream 0.5 m away from the gate (at a dotted line on the leftmost), wherein three-dimensional velocities at the inner boundaries are inverted by parabolic distribution. Under a first working condition, the three-dimensional model is used on the left of a water tank, a two-dimensional model is used on the right of the water tank, that is, the three-dimensional model is used to simulate dam break of the reservoir, and the two-dimensional model is used to simulate step surge. Under a second working condition, a two-dimensional simulation area/a three-dimensional simulation area are exchanged, that is, the two-dimensional model is used to simulate dam break of the reservoir, and the three-dimensional model is used to simulate step surge. Under the first working condition, 1030×60×68 (length×width×height, the same below) computational grids are adopted in a three-dimensional simulation area to simulate a 5.15 m×0.3 m×0.34 m spatial dimension, 750×60 (length×width, the same below) computational grids are adopted in a two-dimensional simulation area to simulate a 3.75 m×0.3 m spatial dimension; and under the second working condition, 1030×60 computational grids are adopted in the two-dimensional simulation area, and 750×60×68 computational grids are adopted in the three-dimensional simulation area. The grid dimension of the two-dimensional model is $\Delta x_{2D}=\Delta y_{2D}=0.005$ m, and the grid dimension of the three-dimensional model is $\Delta x_{3D}=\Delta y_{3D}=\Delta z_{3D}=0.005$ m. Each wall surface in a computation area satisfies a non-slip fixed wall boundary condition. A water body in an upstream reservoir in an initial state is in a hydrostatic state. During simulation, the gravity acceleration of the water body is set as: $g=-9.8$ m/s$^2$, the density and viscosity of the water are: $\rho=10^3$ kg/m$^3$, and $v=10^{-6}$ m$^2$/s.

Figure 4:
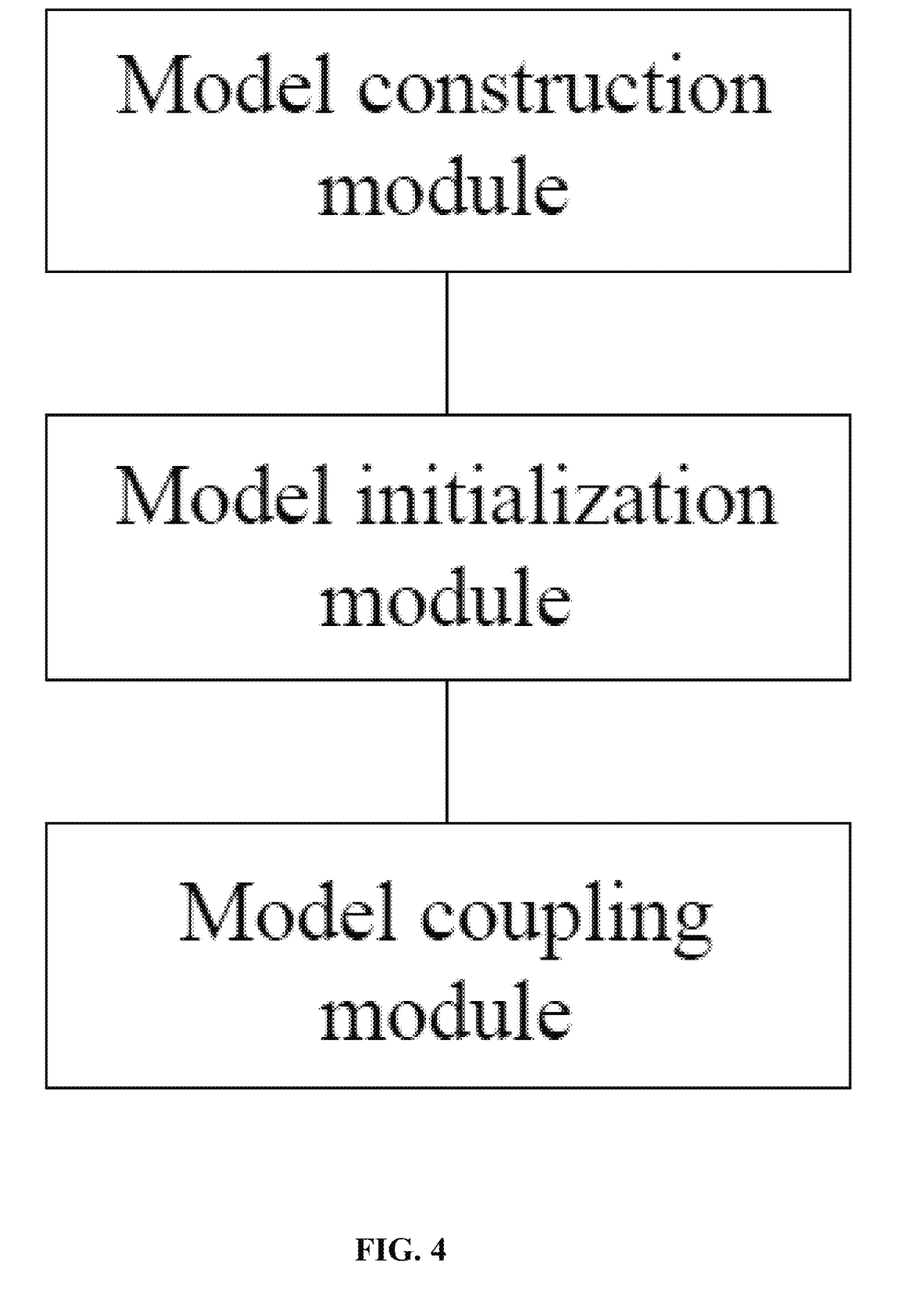
FIG. 4 is a modular block diagram of a construction system for a hydrodynamic joint computation model in embodiment 2.

When dam break occurs respectively at t=0.22 s, 0.90 s, 1.36 s and 3.30 s, an experimental photo of a dam break surge wave and a contrast diagram of simulation results under the two working conditions are shown in FIG. 4, wherein a shadow area in the three-dimensional model is a three-dimensional simulation result in the hydrodynamic joint computation model, and a curve in the two-dimensional model is a two-dimensional simulation result in the hydrodynamic joint computation model.

Embodiment 2

The present embodiment discloses a construction system for a hydrodynamic joint computation model, configured to achieve the construction method for the hydrodynamic joint computation model in embodiment 1; and as shown in FIG. 4, the construction system for the hydrodynamic joint computation model includes:

a model construction module configured to construct an initial hydrodynamic joint computation model, the initial hydrodynamic joint computation model including a two-dimensional model and a three-dimensional model which are connected in sequence, a plurality of layers of computational grids being nested in a junction of the two-dimensional model and the three-dimensional model, the plurality of layers of computational grids of the two-dimensional model forming inner boundaries of the two-dimensional model, and the plurality of layers of computational grids of the three-dimensional model forming inner boundaries of the three-dimensional model;

a model initialization module in communication connection with the model construction module and configured to respectively initialize the two-dimensional model and the three-dimensional model; and a model coupling module in communication connection with the model initialization module and configured to obtain three-dimensional definition parameters of the inner boundaries of the three-dimensional model according to two-dimensional initial parameters of the computational grids in the inner boundaries of the two-dimensional model, and then, assign the three-dimensional definition parameters to the inner boundaries of the three-dimensional model; configured to obtain two-dimensional definition parameters of the computational grids in the inner boundaries of the two-dimensional model according to the three-dimensional definition parameters of the inner boundaries of the three-dimensional model, and then, assign the two-dimensional parameters to the computational grids in the inner boundaries of the two-dimensional model; and further configured to update the two-dimensional definition parameters into new two-dimensional initial parameters, and then, reobtain the three-dimensional definition parameters of the inner boundaries of the three-dimensional model according to the two-dimensional initial parameters of the computational grids in the inner boundaries of the two-dimensional model until computation is converged or ended when a preset simulation time is reached to obtain the hydrodynamic joint computation model.

Embodiment 3

On the basis of embodiment 1 or 2, the present embodiment discloses an electronic device. The device may be a smartphone, a tablet personal computer, a notebook computer or a desktop computer, etc. The electronic device may be known as a terminal, a portable terminal, a desktop terminal, etc. As shown in Figures FIG. 3A, FIG. 3B, FIG. 3C and FIG. 3D. the electronic device includes:

a memory configured to store a computer program instruction; and a processor configured to execute the computer program instruction, thereby completing the operation of the construction method for the hydrodynamic joint computation model according to any one of embodiment 1.

Embodiment 4

On the basis of any one of embodiments 1 to 3, the present embodiment discloses a computer-readable storage medium configured to store a computer-readable computer program instruction, wherein the computer program instruction is configured to, when operating, perform the operation of the construction method for the hydrodynamic joint computation model according to embodiment 1.

Obviously, it should be understood by the skill in the art that each of the above-mentioned modules or steps in the present disclosure may be achieved by means of a universal computation apparatus, they may be concentrated on a single computation apparatus or distributed on a network consisting of a plurality of computation apparatuses, and optionally, they may be achieved by a program code executable for the computation apparatuses, and thus, they may be stored in a storage apparatus and performed by the computation apparatuses or may be respectively made into various integrated circuit modules, or a plurality of modules or steps therein may be made into a single integrated circuit module. In this way, the present disclosure is not limited to any specific hardware and software combinations.

Finally, it should be noted that the above embodiments are merely intended to describe the technical solutions of the present disclosure, rather than to limit them. Although the present disclosure has been described in detail with reference to the aforementioned embodiments, it should be understood by those of ordinary skill in the art that they may still modify the technical solutions recorded in each of the foregoing embodiments or equivalently substitute parts of technical features therein. These modifications or substitutions do not make the essences of the corresponding technical solutions depart from the spirits and scope of the technical solutions of the embodiments of the present disclosure.

Finally, it should be noted that the above embodiments are merely preferred embodiments of the present disclosure, but are not intended to limit the protection scope of the present disclosure. Any modifications, equivalent substitutions, improvements, etc. made within the spirit and principle of the present disclosure shall fall within the protection scope of the present disclosure.

What is claimed is:

1. A construction method for a hydrodynamic joint computation model, comprising:
   constructing an initial hydrodynamic joint computation model, the initial hydrodynamic joint computation model comprising a two-dimensional model and a three-dimensional model which are connected in sequence, a plurality of layers of computational grids being nested in a junction of the two-dimensional model and the three-dimensional model, the plurality of layers of computational grids of the two-dimensional model forming inner boundaries of the two-dimensional model, and the plurality of layers of computational grids of the three-dimensional model forming inner boundaries of the three-dimensional model;
   respectively initializing the two-dimensional model and the three-dimensional model;
   obtaining three-dimensional definition parameters of the inner boundaries of the three-dimensional model according to two-dimensional initial parameters of the computational grids in the inner boundaries of the two-dimensional model, and then, assigning the three-dimensional definition parameters to the inner boundaries of the three-dimensional model;
   obtaining two-dimensional definition parameters of the computational grids in the inner boundaries of the two-dimensional model according to the three-dimensional definition parameters of the inner boundaries of the three-dimensional model, and then, assigning the two-dimensional definition parameters to the computational grids in the inner boundaries of the two-dimensional model; and
   updating the two-dimensional definition parameters into new two-dimensional initial parameters, and then, reobtaining the three-dimensional definition parameters of the inner boundaries of the three-dimensional model according to the two-dimensional initial parameters of the computational grids in the inner boundaries of the two-dimensional model until computation is converged or ended when a preset simulation time is reached to obtain the hydrodynamic joint computation model, wherein
   obtaining three-dimensional definition parameters of the inner boundaries of the three-dimensional model according to two-dimensional initial parameters of the computational grids in the inner boundaries of the two-dimensional model comprises:
      obtaining actual physical quantities of the computational grids in the inner boundaries of the two-dimensional model according to the two-dimensional initial parameters of the computational grids in the inner boundaries of the two-dimensional model; and
      obtaining the three-dimensional definition parameters of the inner boundaries of the three-dimensional model according to the actual physical quantities of the computational grids in the inner boundaries of the two-dimensional model;
   assigning the three-dimensional definition parameters to the inner boundaries of the three-dimensional model comprises:
      obtaining a number of vertical grids in the inner boundaries of the three-dimensional model according to the three-dimensional definition parameters;
      obtaining unit definition parameters of all vertical computational grids in the inner boundaries of the three-dimensional model according to the three-dimensional definition parameters and the number of the vertical grids, wherein, the unit definition parameters are equal to the three-dimensional definition parameters or the number of the vertical grids; and
      respectively assigning the unit definition parameters to all the vertical computational grids in the inner boundaries of the three-dimensional model; and
   obtaining two-dimensional definition parameters of the computational grids in the inner boundaries of the two-dimensional model according to the three-dimensional definition parameters of the inner boundaries of the three-dimensional model comprises:
      obtaining actual physical quantities of any computational grids in the inner boundaries of the three-dimensional model according to the three-dimensional definition parameters of the inner boundaries of the three-dimensional model; and
      obtaining the two-dimensional definition parameters of the inner boundaries of the two-dimensional model according to the actual physical quantities of the computational grids in the inner boundaries of the three-dimensional model.

2. The construction method for the hydrodynamic joint computation model according to claim 1, wherein four layers of computational grids are nested in the junction of the two-dimensional model and the three-dimensional model, the four layers of computational grids of the two-dimensional model form the inner boundaries of the two-dimensional model, the four layers of computational grids of the three-dimensional model form the inner boundaries of the three-dimensional model, and the inner boundaries of the two-dimensional model are aligned with the inner boundaries of the three-dimensional model.

3. The construction method for the hydrodynamic joint computation model according to claim 1, wherein the respectively initializing the two-dimensional model and the three-dimensional model comprises:
defining reference quantities to achieve conversion between grid units and physical units in the two-dimensional model and the three-dimensional model.

4. The construction method for the hydrodynamic joint computation model according to claim 1, wherein the respectively initializing the two-dimensional model and the three-dimensional model further comprises:
defining a dimensional relation so as to obtain all reference quantities according to a specified reference quantity based on the dimensional relation.

5. An electronic device, comprising:
a non-transitory memory configured to store a computer program instruction; and
a processor configured to execute the computer program instruction, thereby completing the operation of the construction method for the hydrodynamic joint computation model according to claim 1.

6. A computer-readable non-transitory storage medium, configured to store a computer-readable computer program instruction, wherein the computer program instruction is configured to, when operating, perform the operation of the construction method for the hydrodynamic joint computation model according to claim 1.

* * * * *